Figure 1:
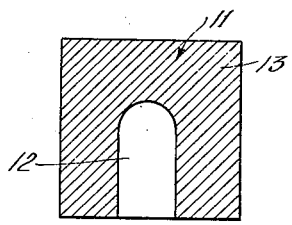
Figure 2:
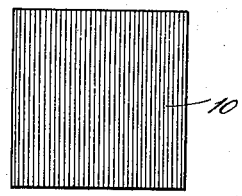
Figure 3:
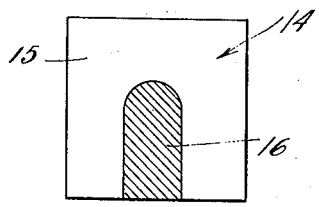
Figure 4:
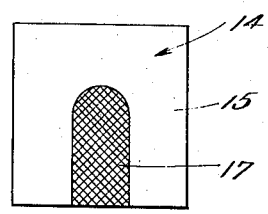
Figure 5:
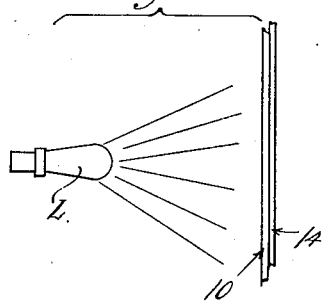

Jan. 8, 1929.  N. OSANN  1,698,448

DOUBLE EXPOSURE PROCESS

Filed Aug. 25, 1924

Inventor.
Norman Osann.
Attorney.

Patented Jan. 8, 1929.

1,698,448

UNITED STATES PATENT OFFICE.

NORMAN OSANN, OF LOS ANGELES, CALIFORNIA.

DOUBLE-EXPOSURE PROCESS.

Application filed August 25, 1924. Serial No. 733,912.

This invention has to do with processes of treating motion picture films, and with the film, as an article of manufacture, after such treatment.

Generally considered, my invention relates to the process of selectively exposing different portions of a single frame of film to the end that said single frame, in finished form, contains a composite image produced from the several exposures. I do this without super-posing any portions of the individual images which result from the selective exposures. In contra-distinction to the well-known double exposure processes where an outlining mat or mask is used to blank such of the film as is not to be exposed during the exposure of the remainder of the film (in other words, where mechanical means are used to render a portion of the film immune to the action of light), I employ chemical means for selectively rendering portions of the film immune to the action of light. For instance, assume only a small portion of the film is exposed. I develop the film without fixing it, and then (by chemical treatment) render the developed image substantially immune to the further action of light without substantially affecting the sensitiveness of the unexposed film. This process is repeated until the entire film is exposed and developed, whereupon it is fixed, and in this way I produce a film with a composite image, in which there is no interference between individual images. A noteworthy feature of the invention is that the composite image is produced on a single-emulsion film, and that during certain steps of the process this film is light-sensitive in parts and yet has developed images (substantially immune from the further action of light) in other parts, a product which is new to the art, as far as I am aware.

The advantages of my process over the mechanical processes are many, and while they need not be gone into with detail, some of the more outstanding may well be indicated. The mechanical processes involve long, tedious steps in the production of proper mats; great accuracy is required in securing registration between the individual images of the successive exposures; individual images are apt to overlap or "show through" one another; a "ghosty" effect often appears on the viewing screen; the entire sensitive area of the film is prone to become "fogged" while exposing a portion thereof; and, unless each step is taken with infinite care, the enlarged composite image on the viewing screen will disclose inaccuracies of registration, blurred outlines, and show various other indications of the artificial nature of the composite image. These problems and objectionable features are practically non-existent in producing films by my process, as will be apparent from an understanding of the detailed specification below.

I will not attempt an exhaustive discussion of the various situations in which my invention may be used to advantage, but will confine my description to its application in the production of film wherein the "action" is to appear to occur before a background foreign to the actual action background; for instance, where the action may take place in a studio, whereas the background may be of an outdoor scenic nature taken, let us say, in foreign lands. On the background may be reproduced from a photograph, as will be apparent later, however, throughout the specifications and claims, the terms "action" and "background" are to be considered very broadly, for they are used merely to distinguish between subjects photographed at different times. The background, of course, may contain action, but this action will be eliminated from the composite image wherever it occurs behind the foreground action. In another situation (for instance, in news reels where a single film frame is often divided into sections, each of which may contain individual action pictures), there may be no common background for the entire film frame, individual portions of the film having their respective individual backgrounds. In such a situation one of the individual frame portions is to be considered as the "action image" and the other as the "background image", this consideration being taken merely for the purpose of distinguishing between the two images and to bring such a situation clearly within the following description.

I will also confine the description to the production of a composite film made up of only two individual images, but it will be understood this is in no way to be considered as a limitative on the invention.

Further objects and novel features of the invention will be set forth in the following detailed specification, reference being had to the accompanying drawings, in which—

Figure 6:
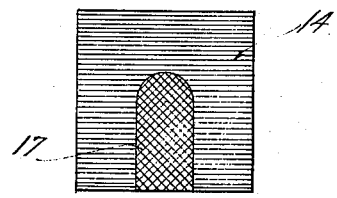

Figs. 1 to 6, inclusive, are in the nature of diagrams illustrating various steps in my process; Fig. 6 also diagrammatically illustrating a completed "composite" film which is the subject-matter of certain of the appended claims.

The figures do not well lend themselves to individual description except as they are referred to in the following specification, and I will therefore give them no more detailed description at this point.

As outlined above, an important feature of my invention lies in the treatment of a film whereby exposed portions of the emulsion may be de-sensitized or rendered immune to the further action of light without affecting the unexposed portions thereof. The preliminary steps of film treatment leading up to the point of immunization may vary, and I will describe several different methods of reaching this point. However, it is not to be inferred that the invention is in any way limited to the particular methods described.

First, let us assume we have a negative 10 (Fig. 2) of an outdoor scene against which studio-produced action is to take place. This negative, which is produced in the usual manner and may or may not have action in it, I will term a "background negative."

The "studio-produced action" may take place before a white, black or sky background. Whether a black or white background is used, it is necessary that there be some degree of contrast (it may be ever so slight) between the background and all elements that are to appear as images in the foreground of the completed composite film; unless it be desired that the image of the composite background show through certain portions of the action image, in which event, corresponding portions of the action element will be given exactly the same color value as the black or white background. However, we will assume that contrast exists between the action background and all elements of the action. The described contrast may be secured by the proper choice of colors for the costumes of the players, etc., or by proper lighting effects. For purposes of description we will assume the studio-action occurs before a white or sky background.

The negative 11 (Fig. 1), which is exposed to the studio-produced action, will be termed an "action negative", and it is developed, fixed and washed in the usual manner. Now the action image 12 on this negative will be outlined by a black, opaque background 13 which extends to all parts of the emulsion not exposed to the action. Due to the contrast between the white background and the action, there will be no part of the action image which has not been light effected to some degree, and therefore, all parts of said action image will be somewhat lighter than the background portion of the negative.

A "composite positive" 14 (Fig. 3) is then printed from the action negative, the black background of the action negative functioning as a mask or mat so all parts 15 of the emulsion on the composite positive which lie without the boundary of the action image on the action negative remain unexposed. The composite positive is then developed in the usual manner to produce a silver image 16 over the action exposed area, but the usual "fixing" process is omitted and the sensitiveness of the unexposed emulsion is therefore preserved. However, I take steps to render the action image on said composite positive substantially immune to the further action of light without affecting the sensitiveness of the unexposed emulsion; I may do this in a variety of ways, all of which lie within the scope of my broader claims, but I will describe a few typical examples, though they are not to be considered as limitative on the invention.

I may accomplish the desired end by immersing the film in certain toning solutions. For instance, I may use cupric ferrocyanide which so chemically affects the image portion as to render it substantially immune to the further action of light. This toning solution reddens the image portion but does not destroy the sensitiveness of the silver salts of the unexposed emulsion, for said solution does not combine with the silver salt in the manner in which it combines with the silver precipitate of the image. Thus, I have produced a silver action image in the usual manner and have then protected this image from the action of light by a layer or shield 17 (Fig. 4) made up of silver combined with the toning agent, which layer may be considered as actinically opaque. Of course, the time of film immersion in and the strength of the toning solution, etc., may be varied to give a protective shield of varied depth or intensity, or even to cause the toning solution to penetrate the emulsion clear to the film base, in which latter case, the image is made up entirely of toned silver.

If I desire to intensify the action image on the composite-positive, I may immerse the toned film in a basic nonactinic dye, the dye being mordanted by proper treatment, for instance, by properly choosing dyes and toning solutions, the toning solution may be of a nature to mordant the chosen dye.

Another way of rendering the composite positive selectively immune to the action of light, is to immerse said positive in a bleaching solution, for instance, potassium ferricyanide with a trace of "hypo", and then to immerse the film in dye. The chemical nature of the action image is such that it is affected by the bleaching solution in a manner to take up and mordant the dye, while the unexposed silver salt covering the unexposed portion of the emulsion is not of a nature to so take up the dye. The dye will be of a non-actinic nature, and therefore the dyed image is substantially immune to the further action of light, while the undyed background of the film remains sensitive to light.

After the toning or dyeing treatment, the composite positive is washed and dried in the usual manner and is then put in a printing machine. The background negative is placed in the printing machine between the composite positive and the source of illumination L (see Fig. 5). Since only the unexposed portion of the composite positive is sensitive to light reaching it through the background negative, only those parts of the composite positive which lie without the boundaries of the action image will be exposed to the background image on the background negative. The composite positive is then redeveloped (precipitating the silver from the silver salts of the newly exposed emulsion) fixed, washed and dried in the usual manner. During the redevelopment and fixing process, the action image usually becomes less dense, or, if the process included the bleaching of the action image, said image becomes intensified.

From the completed composite-positive (Fig. 6), so-called "dupe" negatives are printed and from the dupe negatives are produced the commercial positive prints.

Of course, if the toning or dyeing of the action image gives desirable color to said image, the composite positive may be used directly for projecting purposes.

When it is found that the toned or dyed image is particularly insensitive to some color or colors, it is sometimes advantageous that light of such colors be employed for exposing the composite-positive (in this case, a panchromatic film having a toned action image thereon) to the background or background negative.

If it be desired to secure any particular color value on the finished film or to produce a differential in the color values of the action and background images, either or both action and background exposures may be taken through properly selected color screens.

Now it is possible and sometimes very desirable to eliminate certain of the steps described in the forepart of this specification and yet gain the desired end. For instance, I may dispense with the background negative and eliminate one step in the production of the action image on the composite positive.

The film, which is to be of a composite nature (in this case it will become a "composite-negative") is exposed to action before a black background. It is then developed and washed in the usual manner (but not fixed) and toned or dyed as described above. Since the action background was black, the action image will be surrounded by an unexposed area of emulsion. The film is washed and dried (care being taken not to fog it) and reinserted in the camera. The background is then photographed, and since the action image has been rendered immune from the further action of light, only the previously unexposed portion of the composite film will register the background image. The film is then redeveloped, fixed and washed in the usual manner, and we have now a complete composite negative from which untoned, composite positives may be reproduced, said positives, in turn, being used to produce dupe negatives.

It will be seen that the above described toning or dyeing steps may be considered as selectively immunizing or shielding the whole area of the first exposed emulsion from the further action of light coming from the slide from which exposure was made.

It will be understood that the described process is susceptible of various changes and that the product of the process may be in a variety of forms without departing from the spirit and scope of certain claims; and therefore, I do not wish to be limited to the drawing and description except for such limitations as a fair interpretation of the appended claims may import. The drawings and description are to be considered of an illustrative nature and not as limitative on the invention.

Having described a preferred form of my invention, I claim:

1. The photographic method of producing pictures that includes exposing part of an actinic emulsion, then developing the emulsion, then immersing the emulsion in cupric ferro-cyanide to render only the exposed part substantially immune to the further action of light, re-exposing the emulsion, and developing and fixing it.

2. The photographic method of producing pictures that includes exposing part of an actinic emulsion, then developing the emulsion, then immersing the emulsion in cupric ferro-cyanide to render only the exposed part substantially immune to the further action of light, intensifying the developed image, re-exposing the emulsion, and developing and fixing it.

3. The photographic method of producing pictures that includes exposing part of an actinic emulsion, then developing the emulsion, then immersing the emulsion in cupric ferro-cyanide to render only the exposed part substantially immune to the further action of light, intensifying the developed image by immersing the emulsion in a non-actinic dye, re-exposing the emulsion, and developing and fixing it.

In witness that I claim the foregoing I have hereunto subscribed my name this 19th day of August 1924.

NORMAN OSANN.